US008281902B2

(12) United States Patent
Gray

(10) Patent No.: US 8,281,902 B2
(45) Date of Patent: *Oct. 9, 2012

(54) BRAKING ASSEMBLY

(75) Inventor: Andrew Gray, York (GB)

(73) Assignee: Radlok, S.A.R.L., Luxembourg (LU)

( * ) Notice: Subject to any disclaimer, the term of this patent is extended or adjusted under 35 U.S.C. 154(b) by 13 days.

This patent is subject to a terminal disclaimer.

(21) Appl. No.: 12/923,170

(22) Filed: Sep. 7, 2010

(65) Prior Publication Data

US 2010/0326774 A1    Dec. 30, 2010

Related U.S. Application Data

(63) Continuation of application No. 10/529,773, filed on Apr. 20, 2005, now Pat. No. 7,810,612.

(30) Foreign Application Priority Data

Oct. 1, 2002 (GB) .................................. 0222672.8

(51) Int. Cl.
*B60B 39/00* (2006.01)

(52) U.S. Cl. ............ 188/4 B; 188/1.12; 188/5; 188/111

(58) Field of Classification Search .................. 188/1.12, 188/4 B, 5, 111, 162, 163

See application file for complete search history.

(56) References Cited

U.S. PATENT DOCUMENTS

| 5,432,412 A | 7/1995 | Harris et al. |
| 5,497,857 A | 3/1996 | Warren et al. |
| 5,823,302 A | 10/1998 | Schweninger |
| 5,881,846 A | 3/1999 | French et al. |
| 6,362,728 B1 | 3/2002 | Lace et al. |
| 6,374,955 B1 | 4/2002 | Gray |
| 6,945,366 B2 | 9/2005 | Taba |

FOREIGN PATENT DOCUMENTS

GB    2379804    3/2003

*Primary Examiner* — Bradley King
(74) *Attorney, Agent, or Firm* — Dykema Gossett PLLC

(57) ABSTRACT

A vehicle braking assembly for a wheel includes a braking member arranged to move relative to the main body of the wheel between an inoperative and an operative position, a resilient biasing member for urging the braking member into the inoperative position, and a latch for causing the braking member to move to the operative position, the latch being operable by coded message passed by a separate transmitter as electromagnetic radiation and the assembly is provided with an EMR sensor.

15 Claims, 8 Drawing Sheets

BRAKING ASSEMBLY

CROSS-REFERENCE TO RELATED APPLICATION

This application is a continuation of application Ser. No. 10/529,773, filed Apr. 20, 2005, now U.S. Pat. No. 7,810,612.

BACKGROUND OF THE INVENTION

1. Field of the Invention

The present invention relates to a novel braking assembly, a novel security system associated therewith, and a novel method of theft prevention, e.g., of wheeled carriages.

The novel braking assembly of the present invention may be suitably used in a variety of vehicles. However, it is especially suited for use on or in conjunction with a shopping trolley or cart.

2. The Prior Art

European Patent No. 1 101 685 describes a vehicle braking assembly in which a braking member is activated by movement of the assembly over a magnetic material such that, when activated, the braking member moves to an operative position which serves to raise the wheel from the ground, hence preventing the vehicle from progressing beyond the magnetic material.

Other braking mechanisms are known which operate, for example, by radio signal, infra red signal, etc. However, such braking devices generally require a motor to operate the braking mechanism. One particular disadvantage of electronic braking devices is that they require a power source, for example, a battery, to operate the receiver and/or other electronic parts. For the systems to function properly, the battery must be constantly checked or monitored and replaced or recharged.

A further disadvantage of known braking assemblies and/or anti-theft systems is that, once triggered, they must be reset.

I have now developed a braking assembly which overcomes or mitigates some of the disadvantages of the prior art.

SUMMARY OF THE INVENTION

In particular, the braking assembly of the present invention is advantageous in that, inter alia, a generator may be provided to power electronic components and/or to recharge a solid state battery. Furthermore, the generator may be operably linked to one or more wheels of the vehicle and thus the user of the cart or trolley will provide the motion for the generator.

The braking assembly of the present invention is advantageous in that it may be used in a manner analogous to existing assemblies, that is, to prevent a cart or trolley from being removed from, for example, a retailer's car park. However, in addition, the assembly of the invention may prevent a cart or trolley from being removed from the store, hence preventing unpaid for goods from being removed from the store.

The braking assembly of the present invention may also be used on a variety of wheels, including conventionally known trolley or cart wheels, but also including wheels used on, for example, moving walkways. By the term wheel it is intended to include wheels as hereinbefore described castors, etc.

Thus, according to the invention a vehicle braking assembly for a wheel is provided which comprises a braking member arranged to move relative to the main body of the wheel between an inoperative and an operative position, blocking means adapted to prevent the braking member from moving to an operative position and trigger means adapted to activate the braking member to move to an operative position, wherein the trigger means is operable by a coded message passed by a separate transmitter as electromagnetic radiation and the assembly is provided with an EMR sensor.

Any conventionally known brake foot may be used. However, preferentially, the brake foot is the same or similar to that described in European Patent No. 1 101 685 which is incorporated herein by reference.

The wheel may optionally be provided with a circumferential brake guide, e.g., in the form of a circumferential slot or groove.

Thus a wheel assembly of the invention may comprise a wheel or castor supported in a fork and fixed using an axle fastening means, e.g., an axle bolt. The wheel may also be provided with a peripheral brake foot.

A variety of electromagnetic radiation (EMR) may be used to trigger and/or reset the braking assembly. Thus the EMR may comprise, radio waves, i.e., short or long wave radio waves, light waves, e.g., infra red light, visible light, UV light or any combination thereof. Preferably, the light source comprises an infra red light source.

An EMR sensor may be positioned in any reasonable location on the wheel assembly, preferably the sensor is positioned in a well exposed position towards the upper part wheel assembly in its normal "in use" position.

In a preferred embodiment of the invention, the braking mechanism of the invention comprises a latch, which is operably linked to the sensor. An inner portion of the wheel comprises recessed toothed region, positioned such that, when desired, the latch may engage with one or more of the teeth. Thus, when the brake is in the inoperable position, the latch is closed and the wheel and the recessed toothed portion freely rotates. When the latch is triggered, it engages with a toothed region of the recessed portion of the wheel. The continued rotation of the wheel and the engaged latch moves the brake from an inoperable position to an operable and braking position.

Thus, according to a further aspect of the invention we provide a vehicle braking assembly for a wheel which comprises a braking member arranged to move relative to the main body of the wheel between an inoperative and an operative position, blocking means adapted to prevent the braking member from moving to an operative position and trigger means adapted to activate the braking member to move to an operative position, characterised in that the trigger means comprises a latch which is adapted to engage with a toothed portion of the body of the wheel.

Any conventionally known blocking means may be utilised. However, preferentially, the blocking means will comprise a resilient biasing member which is adapted to urge the braking member into the inoperable position. Preferably, the biasing member will comprise a resilient spring, e.g. a torsion spring. The spring is preferably situated adjacent or around the axle of the wheel assembly. In an especially preferred embodiment the wheel assembly may be provided with an axial housing for resilient spring. This, in use, the spring biasing means will retain the brake in the inoperable position until the trigger is activated.

It will be understood by one skilled in the art that the vehicle wheel assembly provided with a latch assembly as hereinbefore described may comprise any conventionally trolley or cart wheel which requires a braking mechanism. However, preferentially, this aspect of the invention comprises a vehicle wheel assembly provided with a latch assembly wherein the vehicle wheel assembly is an assembly comprising a sensor as hereinbefore described.

Preferentially, the latch is adapted to operate in a radial direction and thus, the recess portion of the wheel is in a substantially circumferential position. Although it will be understood that the recess which co-operates with the latch may be positioned such that the latch moves radially, rather than circumferentially. However, circumferential movement of the latch is preferred.

Furthermore, the braking system will operate with a single toothed recess portion the reaction time to the trigger is faster if the assembly is provided, with a plurality of toothed recesses.

In the braking assembly of the invention the latch is preferably operated by a solenoid, electric motor, stepper motor, etc.

It is a particular advantage of the present invention that the braking mechanism does not require that it be manually reset. Thus, after the solenoid and latch mechanism has been triggered so as to activate the brakinq mechanism, a second EMR source may be provided which acts as a resetting beam, e.g., triggering the solenoid, motor and/or bellows to revert to its rest position. Thus the action of the aforementioned biasing means which urges the braking mechanism into an inoperable position, acts to reset the assembly without need for manual interference.

Furthermore, in a retail environment that has, for example, an EMS tagging security system, such an EMS system may be linked to an EMR source transmitter as hereinbefore described, thus, for example sending a brake triggering message to braking assembly device on the wheel causing the brake to activate immediately.

The solenoid or motor may preferably be provided with a support power supply, e.g., in the form of a battery and a programmable integrated chip. It is a further advantage of the present invention to provide a wheel assembly which is also adapted to act as a generator.

Thus, in a further aspect of the invention a vehicle wheel assembly adapted to act as a power generator comprises a fixed body member and a rotatably mounted wheel member, characterised in that one of the body member and the wheel member is provided with a stator and the other member is provided with a plurality of permanent magnets which are of alternating polarity.

In a preferred embodiment of the invention, the stationary portion of the wheel assembly, e.g., the portion housing the latch assembly, may be provided with a stator and the rotatable portion of the wheel assembly e.g., the wheel itself may be provided with one or more permanent magnets. Preferentially, the wheel is provided with a plurality of permanent magnets which are of alternating polarity. Thus, in use, rotation of the wheel causes the permanent magnets to pass the stator and generate an electromagnetic field current.

It will be understood by one skilled in the art that the vehicle wheel assembly provided with a power generator as hereinbefore described may comprise any conventionally trolley or cart wheel which requires a power source and/or battery recharge system. However, preferentially, this aspect of the invention comprises a vehicle wheel assembly provided with a power generator wherein the vehicle wheel assembly is an assembly comprising a sensor as hereinbefore described.

Preferably, the stator is linked to means for recharging a battery and/or means for storing the power generated. It will be understood by one skilled in the art that this aspect of the invention may utilise a plurality of permanent magnets in the latch housing and a stator in the rotatable wheel.

Furthermore, this aspect of the invention is novel per se and may therefore be used in conventionally known trolley wheels or castors which require a power source.

The braking assembly of the invention is advantageous in that, inter alia, it is capable of operating under the influence of, for example, a radio signal, infra red signal, etc. Therefore, not only can the assembly be used in, for example, preventing a wheeled vehicle being removed from a store perimeter, it may, by the correct positioning of an EMR source, be utilised as an in-store anti-theft device.

Furthermore, the assembly of the invention is advantageous in that it does not require a power source or, if the assembly is provided with a back-up power source, e.g. in the form of a battery cell, it does not require recharging or replacing. A yet further advantage of the assembly if the invention is that it comprises means for resetting the braking assembly at an appropriate moment after the braking mechanism has been triggered.

The invention will now be described by way of example only and with reference to the accompanying drawing.

DETAILED DESCRIPTION OF THE PREFERRED EMBODIMENTS

Figure 1:
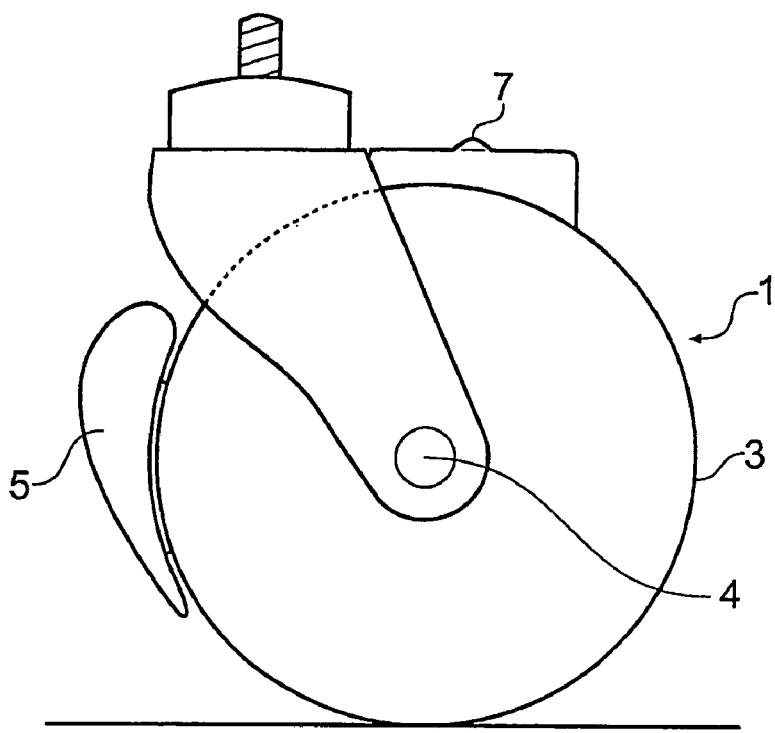
FIG. 1 is a side view of a wheel of the invention with a braking member in a first, inoperable position.
Figure 2:
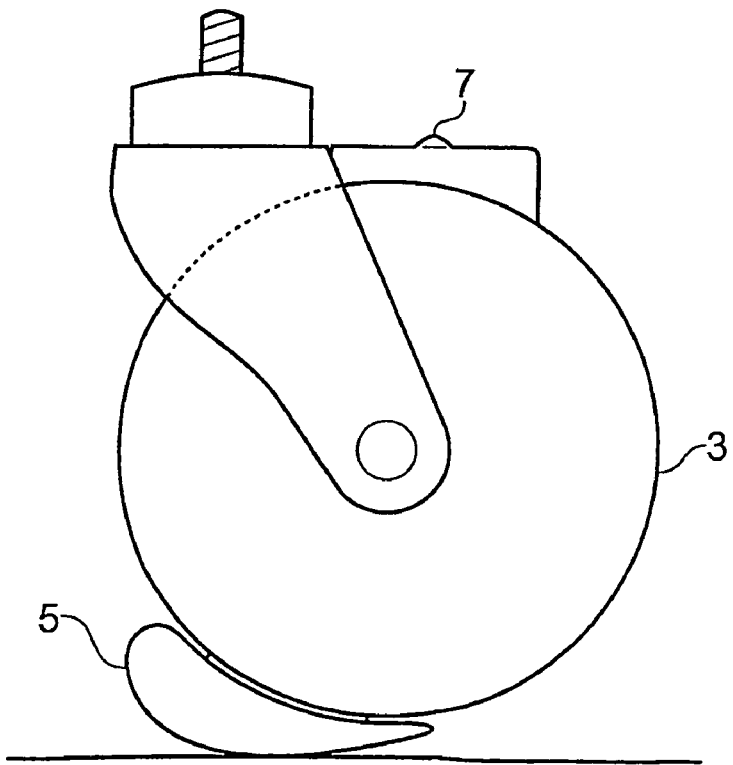
FIG. 2 is a side view of the wheel with the braking member in a second, operable position.
Figure 3:
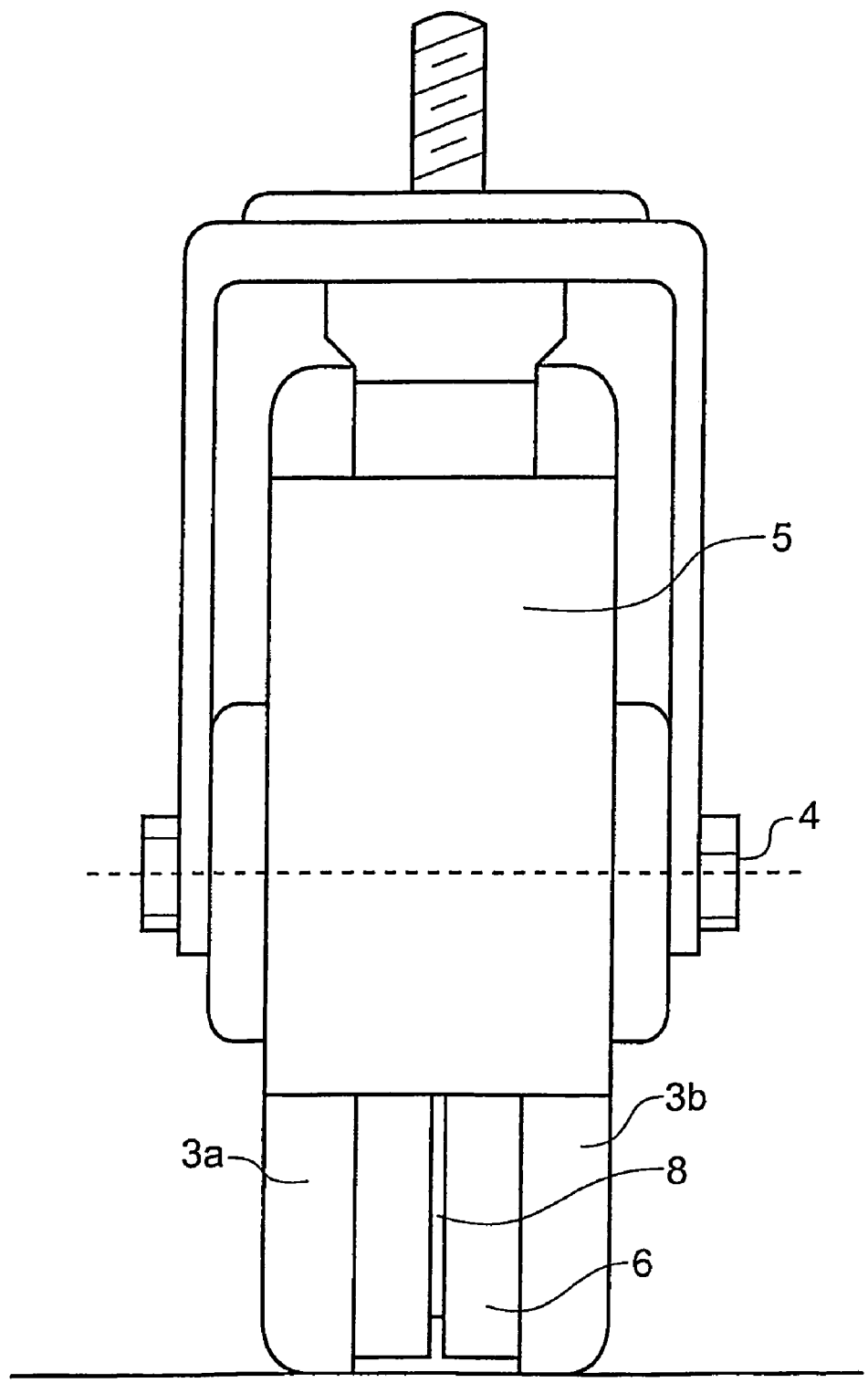
FIG. 3 is a front view of the wheel in the first, inoperable position.

In the illustrated embodiment there is provided a castor 1 having connection means to the vehicle through forks and a bolt arrangement that allows rotation between the wheel and the vehicle. From the side view in FIG. 1 there is also seen a wheel 3 which rotates about the axle 4 and brake member 5 which is shown here in its first or non braking position and in FIG. 2 in its second or braking position. In FIG. 3. viewing the device from the front there is provided two wheels 3a and 3b within the castor and a body 6 that will remain fixed in relation to the castor. In such cases where there is a fixed central body it is possible to have the fixing means to the vehicle from the fixed body but for strength reasons this is unlikely to be the preferred option. The fixed body allows for the inclusion of the electronic components of the device including the light receiver 7 if the device is operated by infrared means.

Figure 4:
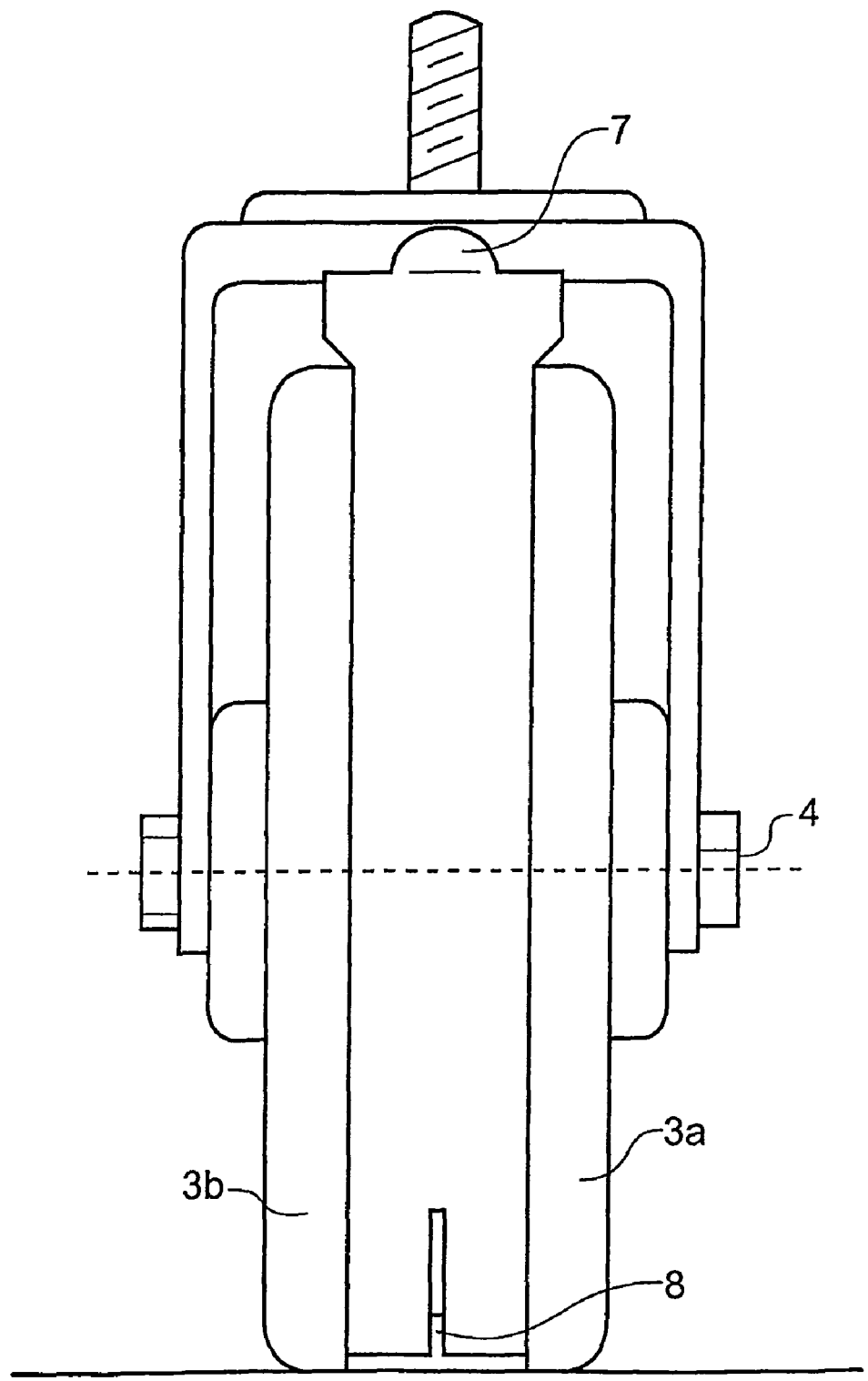
FIG. 4 is a rear view of the wheel in the first, inoperable position.

There is also provided in the body a slot 8 that allows for the rotation of the brake member from its first to its second position. A view of the back, trailing aspect, of the castor is shown on FIG. 4.

Figure 5:
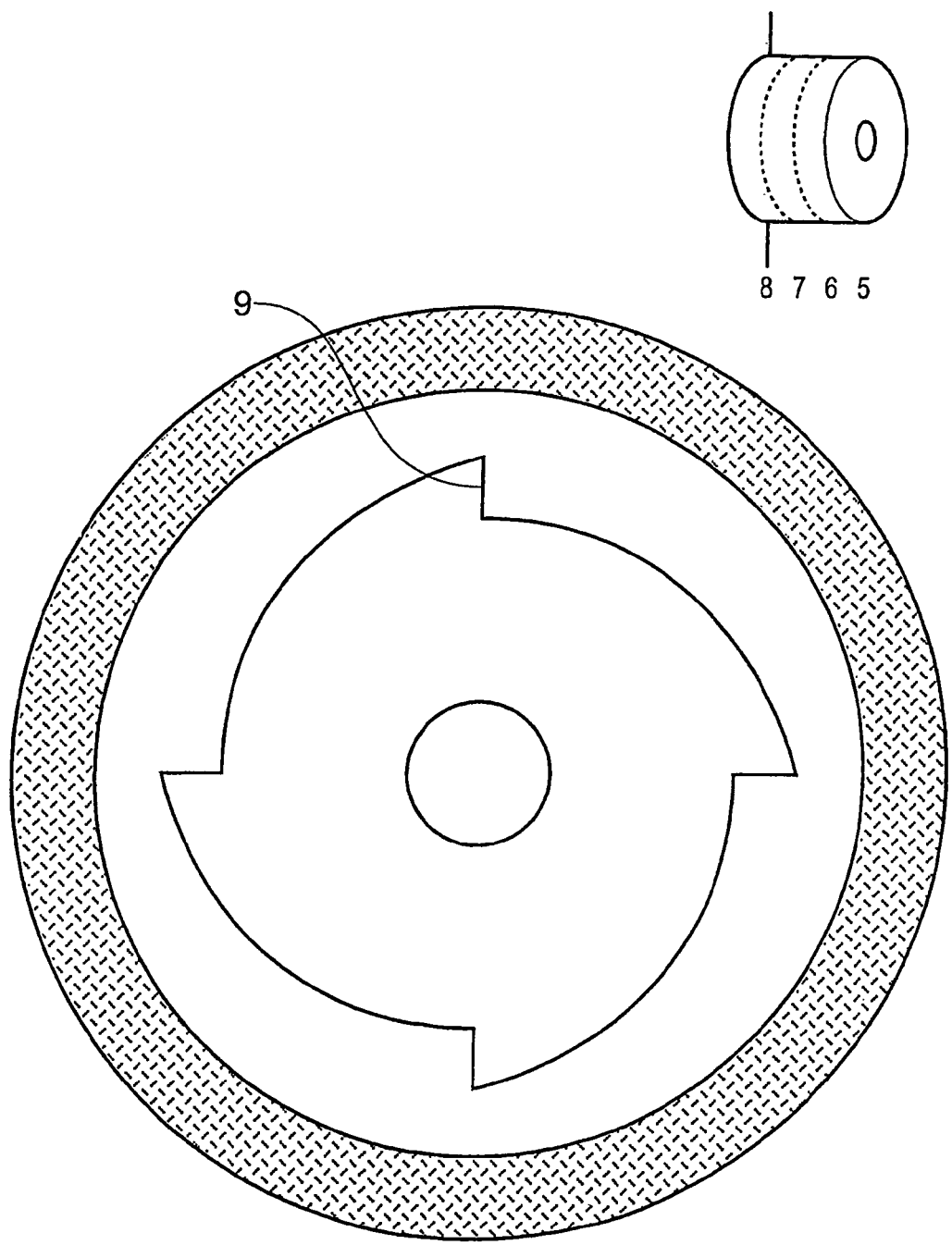
FIG. 5 is an internal side view of one wheel of the invention.
Figure 6:
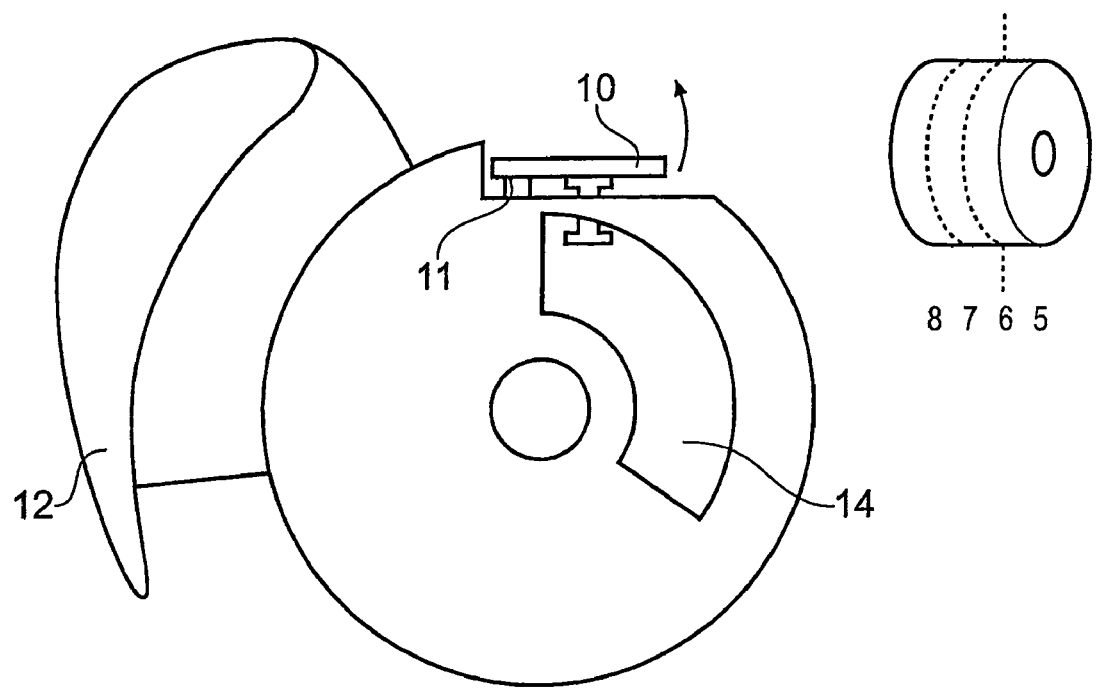
FIG. 6 is a side view of the braking member.

When the device is triggered, there is engagement between the braking member 5 and wheel 3a. There is in wheel 3a provided a toothed connection means 9 which in the preferred embodiment is in a recess shown in FIGS. 5 and 10. As the wheel will be rotating as part of normal use, when the latch 10 is operated around pivot point 11 as shown in FIG. 6, there will be a connection between tooth and latch which will drive the brake member to rotate from its first to its second and triggered position. The braking member also includes the brake foot 12 which comes between the wheel and the ground in the braking position. There is provided within the body the slot 8, but this is limited in length to stop the brake member from rotating through too great and angle and become ineffective. There is shown on the braking member a contact point that will come against the end of the slot to prevent further rotation. There is also provided in the braking member a cut away section 14 which will allow for the provision of a solenoid or motor 15.

Figure 7:
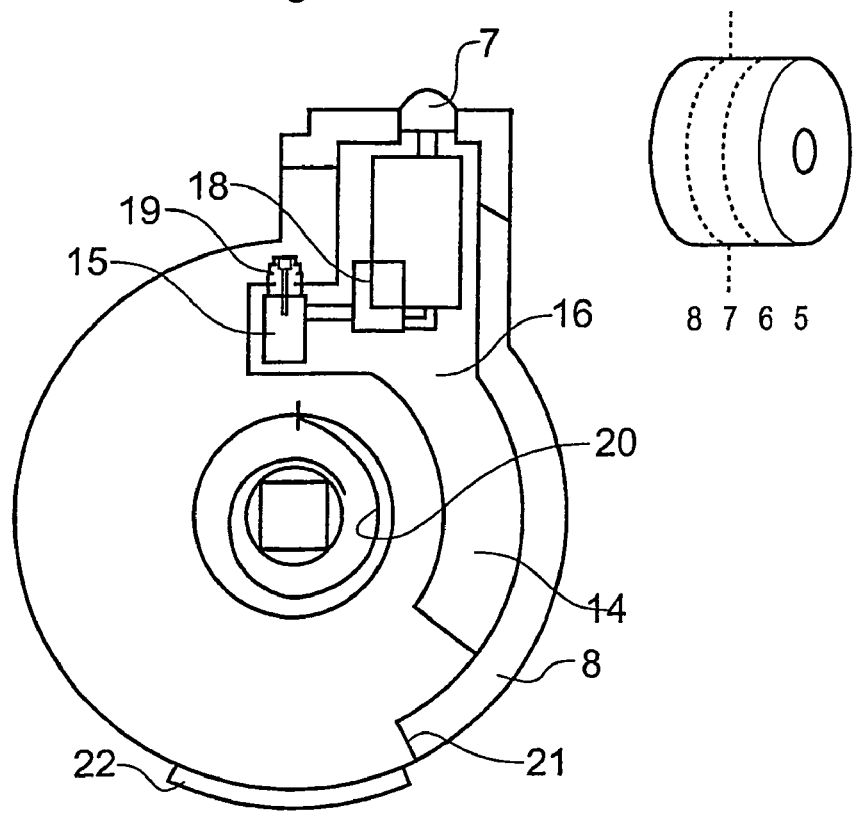
FIG. 7 is a side view of the body of the device.

In FIG. 7 there is shown a body of the castor 6 with light collector 7 and solenoid or motor 15. There is provided within a body a sealed chamber 16 which will also contain a programmable integrated chip 17 and a rechargeable support battery 18. The solenoid could then operate from within this sealed area and its required movement can be transmitted through flexible bellows 19. When triggered the solenoid or motor 15 will extend and rotate the latch around pivot point 11 to engage one of the teeth 9 within the wheel 3a.

When the braking system is no longer required. the solenoid or motor 15 will return from its extended position and thereby allow the latch to drop out of engagement. In order to return the braking member to its first position. there is provided a spring 20 which will be overcome while the user is pushing the trolley against the tooth connection. but when there is no pushing. it will bring the braking member back to its first position. There is also provided a stop section 21 in slot 8.

If the wheel is used in conjunction with a moving walkway. there will be provided on the base of the body a pad 22 which will grip the grid of the moving walkway in the usual way.

Figure 8:
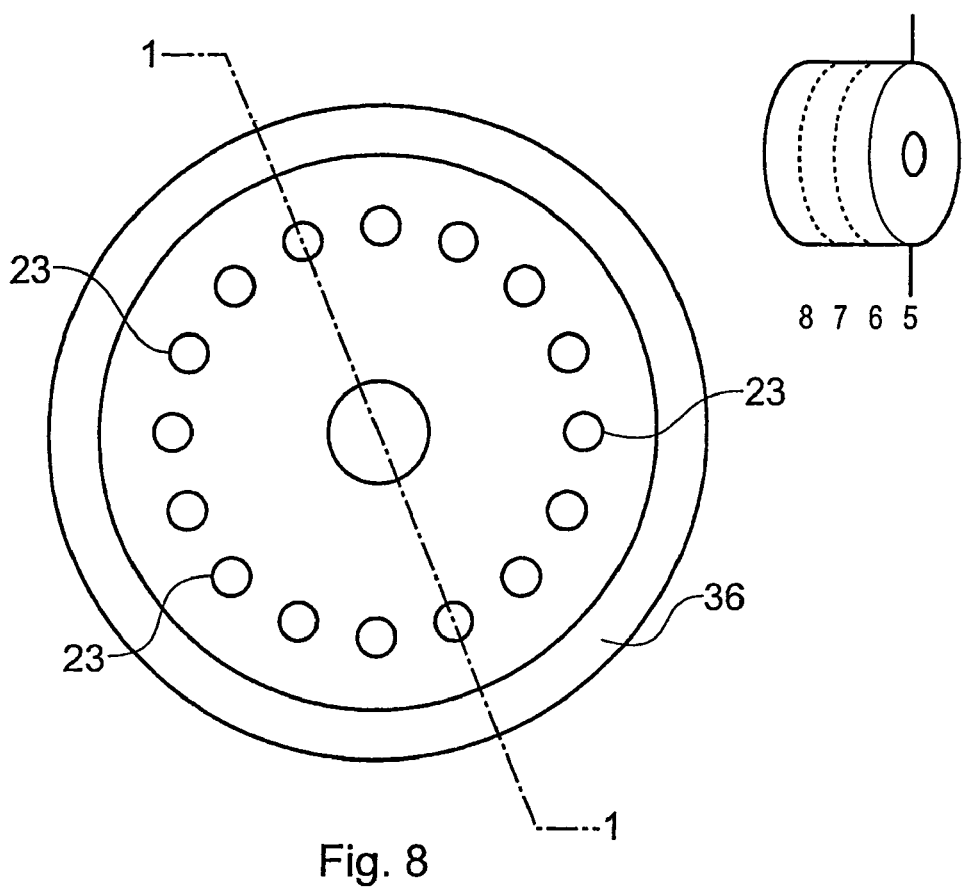
FIG. 8 is an internal side view of the internal face of a second wheel.
Figure 9:
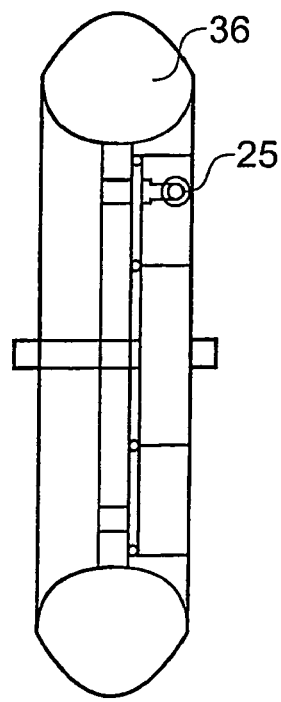
FIG. 9 is a view of the wheel through line 1 showing both rotor and stator.
Figure 10A:
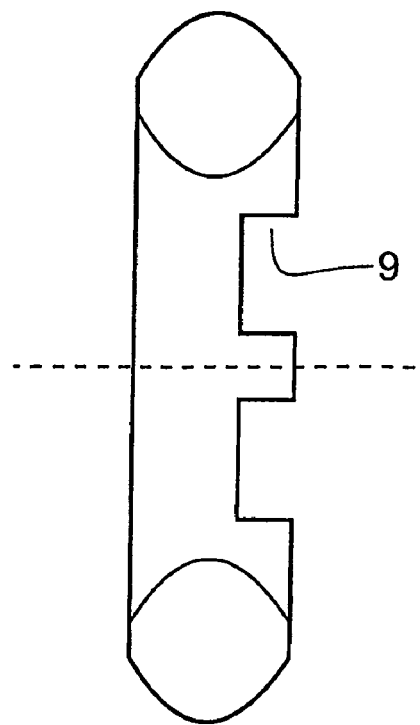
FIG. 10 is a sectional view of the wheel showing a standard rubber tire or a travelator (walkway) wheel.
Figure 10B:
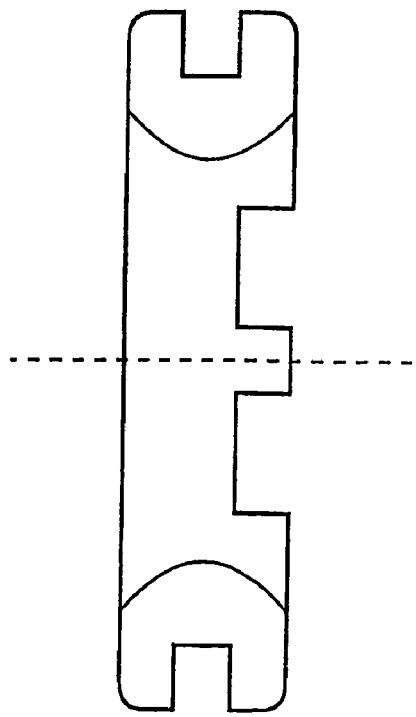

FIG. 8 shows wheel 3b which has set into it a number of magnets 23 which are arranged with a north pole and a south pole facing inward alternately to provide a rotor as part of the generator. The stator 25, as shown in FIG. 9 being a view through line 1 with the inclusion of the stator, is coil arrangement 24 of known type. As a small wheel such as a 125 mm castor rotates often while being pushed at a reasonable walking pace, it is expected that a generator of this type will provide ample power for the device's requirements. Advantageously a generator constructed in this way could have a membrane between the rotor and the stator that will prevent the ingress of dirt from damaging the workings of the stator. FIG. 10 shows the recess within wheel 3a and two kinds of tire one conventional rubber or polyurethane 10a and the other suitable for the walkway application 10b.

Figure 11:
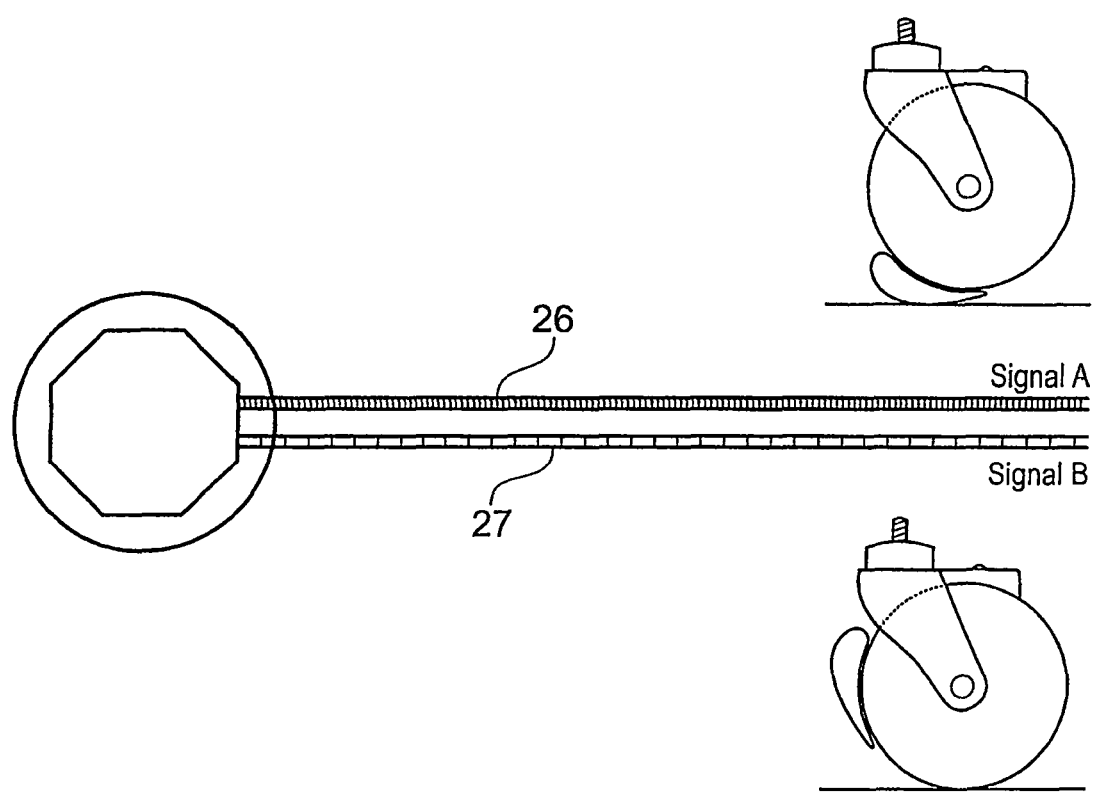
FIG. 11 is a view of an emitter of a twin beam showing the general effect on the wheel.

FIG. 11 shows a likely use of the invention at the perimeter of the store car park where twin and parallel beams are emitted from a single or duel container. The programmable chip in the device will respond to different coded messages contained within the beams. In the illustration beam 26 will be recognised as a reset instruction and beam 27 as a trigger message. Therefore, and assuming that the vehicle is in area permitted by the owner, when the vehicle is being pushed out through the beams it will receive a reset message which will be ignored and then the trigger message. In response to the trigger message the solenoid or motor 15 will operate outward to rotate the latch 10 and generally engage the brake member 5 with the wheel 3a. The solenoid or motor may only operate for a given period but then operate again if the vehicle is not pushed through the reset beam. When the device is pushed or dragged through the reset beam, then the motor will operate and the return means 20 will bring the brake member to its inoperable position. A similar operation could be achieved by the use of two radio transmitters where one signal is generally set beyond the first.

Advantageously, the same system of triggering the device can be used in the store where the device receives a message from a transmitter as it enters an area, for example a supermarket sales floor. The device will receive a number of other messages from additional emitters within the area to which it may respond by braking. The general purpose of this would be to permit a trolley to leave the store only if it had passed through a paying point, for example a check out desk. Various timer lockouts can be programmed in to the chip to allow, for example, a trolley to leave within sixty seconds as experience has shown that people walk in and out of stores without shopping. In this way the present invention can both prevent trolleys from being removed from the site but also prevent goods from being removed by trolley if they have not passed through the payment area.

The invention claimed is:

1. A vehicle braking assembly for a wheel, which comprises a braking member arranged to move relative to a main body of the wheel between an inoperative position and an operative position, blocking means comprising a resilient biasing member adapted to urge the braking member into the inoperative position and trigger means adapted to move the braking member to the operative position; wherein the trigger means comprises a latch which is adapted to engage with a toothed portion of the body of the wheel to provide engagement between the braking member and the wheel, whereby rotation of the wheel drives the braking member from the inoperative position to the operative position.

2. The vehicle braking assembly according to claim 1, wherein an inner portion of the wheel comprises a recessed toothed region positioned such that when the trigger is activated, the latch engages with a tooth.

3. The vehicle braking assembly according to claim 2, wherein when the brake is in the inoperative position, the latch is closed and the wheel and the recessed toothed portion of the wheel freely rotate, and when the trigger is activated the latch engages with a toothed portion of the recessed region of the wheel, which acts to move the brake from an inoperative position to an operative position.

4. The vehicle braking assembly according to claim 3, wherein the latch is adapted to operate in a radial direction and the toothed portion of the wheel comprises a substantially circumferential recess.

5. The vehicle braking assembly according to claim 1, wherein the wheel is provided with a plurality of toothed recesses.

6. The vehicle braking assembly according to claim 1, wherein the resilient biasing member comprises a resilient spring.

7. The vehicle braking assembly according to claim 6, wherein the spring is situated adjacent or around an axle of the wheel assembly.

8. The vehicle braking assembly according to claim 7, including an axial housing for the wheel assembly for the resilient spring.

9. The vehicle braking assembly according to claim 1, wherein the braking member comprises a peripheral brake foot.

10. The vehicle braking assembly according to claim 9, wherein the peripheral brake foot comes between the wheel and a ground surface in the operative position.

11. The vehicle braking assembly according to claim 1, wherein the latch is operably linked to a sensor.

12. The vehicle braking assembly according to claim 10, wherein the trigger means is operable by a coded message passed by a transmitter.

13. The vehicle braking assembly according to claim 11, wherein electromagnetic radiation (EMR) is used to trigger and/or reset the braking assembly.

14. The vehicle braking assembly according to claim 1, wherein the braking member is adapted to be automatically reset.

15. The vehicle braking assembly according to claim 14, including an EMR source which acts as a resetting beam.

* * * * *